Dec. 5, 1961 M. C. SYLVESTER 3,011,669
EXTENDABLE AUTOMOBILE TRUNK-LOADING APPARATUS
Filed Dec. 29, 1958 2 Sheets-Sheet 1

Minnie C. Sylvester
INVENTOR.

BY Eugene P. Farley

Atty.

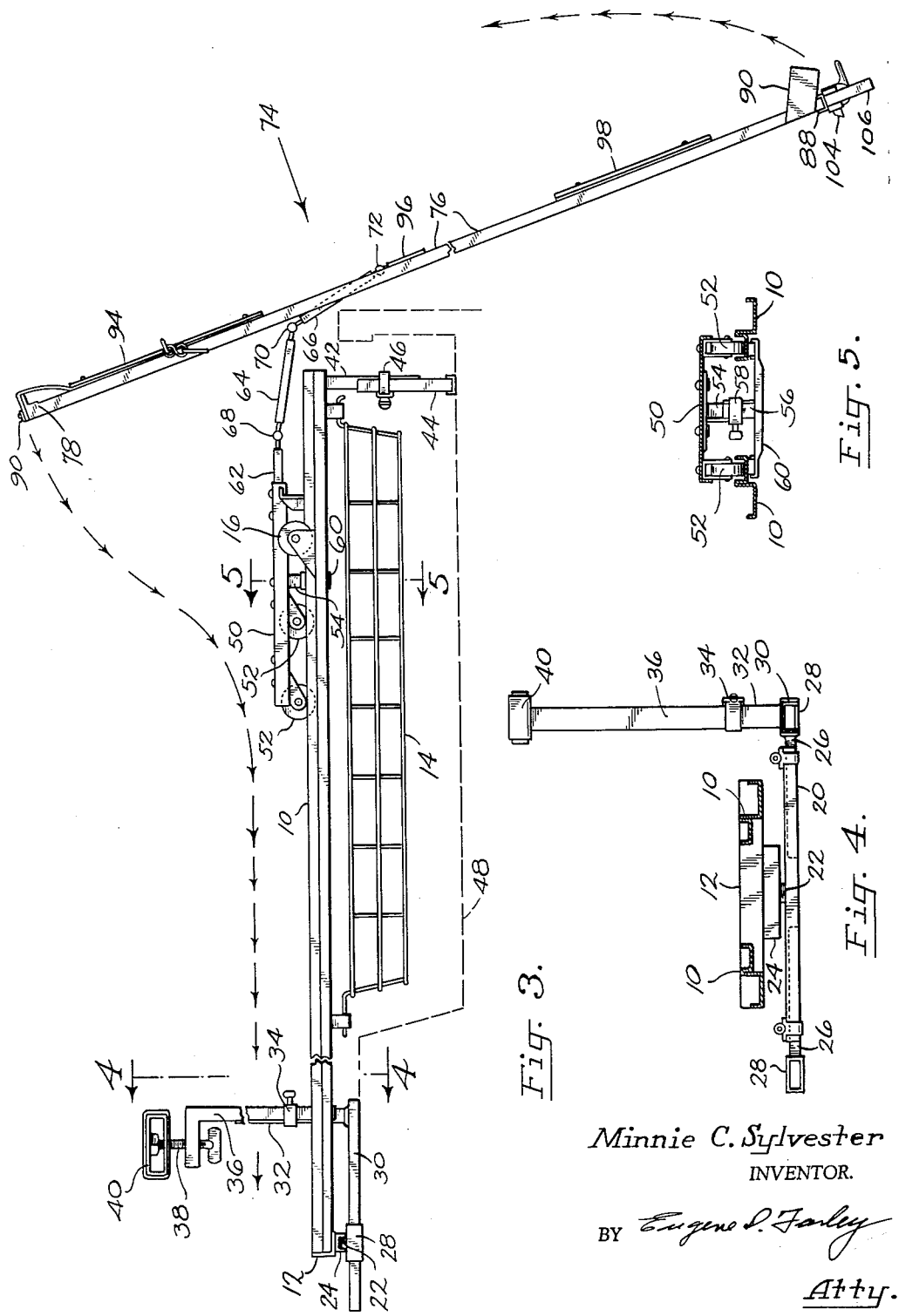

3,011,669
EXTENDABLE AUTOMOBILE TRUNK-LOADING APPARATUS
Minnie C. Sylvester, 7512 SE. Martins, Portland, Oreg.
Filed Dec. 29, 1958, Ser. No. 783,366
7 Claims. (Cl. 214—450)

This invention relates to apparatus for loading articles into automobile trunks. It pertains particularly to apparatus for loading into the trunks of automobiles, golf bags, outboard motors, luggage and similar items which are heavy and awkward to handle.

This application is a continuation-in-part of application Serial No. 624,300, filed November 26, 1956, now Patent No. 2, 964,223 for Automobile Loading Apparatus.

It is the general object of this invention to provide apparatus for loading automobile trunks which apparatus is mountable universally in the great majority of automobiles irrespective of make and trunk dimensions; which may be moved from side to side within the trunk to facilitate stowing luggage therein; which remains securely in position without shifting or rattling; and which, when withdrawn from the trunk, may be tilted downwardly to facilitate the loading and unloading operations.

In the drawings:

FIGS. 2 and 3 are plan and side elevational views, respectively, of the herein described loading apparatus withdrawn from the trunk in loading and unloading position;

Figure 1:
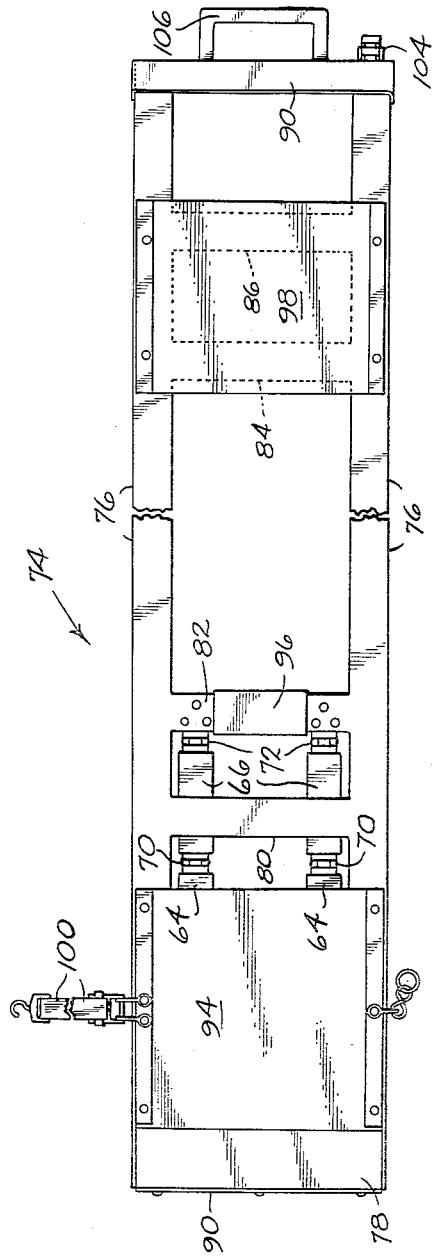
FIG. 1 is a plan view of a loading platform used in the herein described loading apparatus, fully advanced within the automobile trunk.

FIG. 4 is a sectional view taken along line 4—4 of FIG. 3 and illustrating particularly the rearward mounting means employed for mounting the loading apparatus within the trunk, as well as the means for permitting lateral angular movement of the apparatus; and FIG. 5 is a sectional view taken along line 5—5 of FIG. 3 and illustrating particularly the construction of the wheeled carriage which is a component of the loading apparatus.

Referring more particularly to the drawings:

The herein described loading apparatus is mounted on a pair of rails or tracks 10, located longitudinally of the trunk. The rails are interconnected by forward and rearward cross pieces 12, 13. A basket 14 designed to hold golfer's equipment, etc., may be suspended from the underside of the rails, and rollers 16 are mounted on the upper side of lateral extensions thereof. Hooks 18 may be provided just rearwardly of the rollers.

The mounting means employed for mounting the forward ends of the rails within the automobile trunk are illustrated particularly in FIGS. 3 and 4. A cross bar 20 is pivotally attached through pin 22 to cross piece 12, a spacing block 24 being interposed between these two members if desired. Bar 20 is hollow and receives extensions 26 which terminate in sleeves 28. The latter, in turn, receive slidable feet 30.

A vertical standard 32 is welded to one of feet 30. It supports through clamp 34 a segment 36, the upper end of which is bent at right angles and tapped and threaded to accommodate thumb screw 38. The latter supports a bearing pad 40 adapted to bear against the roof of the trunk.

Thus the rearward mounting of the tracks is adjustable so that it will fit universally a wide variety of automobile trunks. It is adjustable longitudinally by sliding feet 30 in sleeves 28; laterally, by sliding extensions 26 in hollow cross bar 20; angularly, by swinging the tracks about pivot point 22; and vertically, by moving standard segment 36 relative to standard 32, a fine vertical adjustment being provided by thumb screw 38.

The mounting means for the rearward end of the tracks comprise a pair of legs formed in segments 42, 44 adjustably interconnected by means of clamp 46. Hence the rear end of the tracks may be adjusted as required to maintain the tracks level when mounted on a stepped automobile trunk floor such as is indicated in dotted outline 48 in FIG. 3.

Tracks 10 support a carriage 50 mounted on wheels 52. Depending from the central portion of the carriage is a segmented post, the two segments 54, 56 of which are adjustably interconnected by a clamp 58. The lower segment of the post is welded to a horizontal plate 60, the longitudinal edges of which are bent upwardly in the direction of the undersurfaces of track 10, thereby stabilizing the carriage (FIG. 5).

Carriage 50 is connected to a series of extensions 62, 64, 66 through hinges 68, 70, 72. The last of these segments is hinged to a load-supporting platform, indicated generally at 74.

In the form of the invention illustrated in the drawings, platform 74 is designed particularly to accommodate one or more golf bags. It includes a pair of side rails 76 interconnected by cross pieces 78, 80, 82, 84, 86, 88, 90. Cross piece 88 engages hooks 18 and cross piece 90, comprising a bent bar, serves as a rack for engaging and bearing the weight of the golf bag when the platform is tilted to its loading and unloading position.

Figure 2:
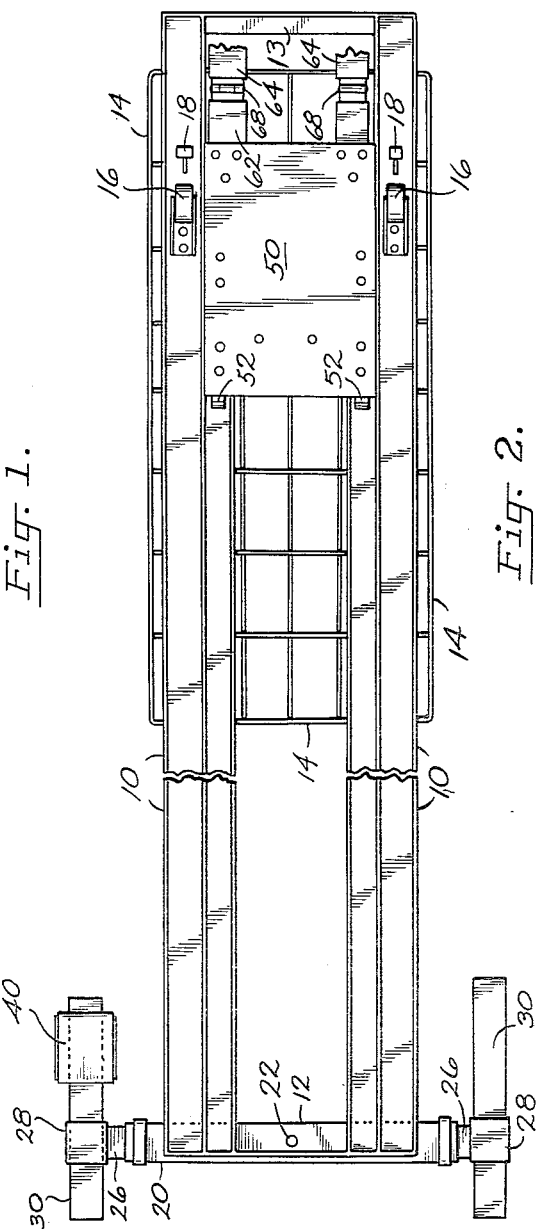

Pads 94, 96 and 98 are fastened to the upper surface of the platform and a strap assembly 100 to the upper segments of side rails 76. In addition, the platform carries a latch 104 designed to engage cross piece 13 and a handle 106. Hence a load such as a golf bag may be placed upon platform 74 when it is in the tilted position of FIG. 3, after which the platform may be raised until its upper end rests on carriage 50 (FIG. 3). Thereupon the entire assembly may be moved forwardly on rollers 16 and wheels 52 until latch 104 engages cross piece 13 and the assembly is in the position of FIGS. 1 and 2, fully advanced within the automobile trunk.

It is to be understood that the form of my invention herewith shown and described is to be taken as a preferred embodiment of the same and that various changes may be effectuated without departing from the spirit of my invention as defined by the appended claims.

Having thus described my invention, I claim:

1. An extendable automobile trunk-loading apparatus comprising a pair of tracks, forward and rearward support means connected to the tracks for mounting the tracks longitudinally in an automobile trunk, a carriage movable between forward and retracted positions on the tracks, an elongated load supporting platform adapted to be supported at one end in superimposed relation on the carriage and extending rearwardly therefrom for support on the rearward support means in the forward position of the carriage, extension means extending rearwardly from the carriage, and hinge means on opposite ends of the extension means interconnecting the carriage and the platform at spaced points permitting downward tilting of the platform outside the trunk when the carriage is withdrawn rearwardly.

2. The loading apparatus of claim 1 including laterally extendable means connected to the forward support means, an upright standard on the laterally extendable means, and vertically adjustable means on the standard adapted to engage the ceiling of the trunk for frictionally clamping the standard between the floor and the ceiling of an automobile trunk in the laterally adjusted position of the standard.

3. The loading apparatus of claim 1 including laterally extendable means connected to the forward support means longitudinally adjustable means connected to the laterally adjustable means, an upright standard on the longitudinally adjustable means, and vertically adjustable extension means on the standard adapted to engage the ceiling of the trunk for frictionally clamping the standard between the floor and the ceiling of an automobile trunk in the longitudinally and laterally adjusted positions of the standard.

4. The loading apparatus of claim 1 including a pivot connection between the tracks and the forward support means for positioning the tracks in varied angular positions in the trunk.

5. An extendable automobile trunk-loading apparatus comprising a pair of tracks, forward and rearward support means connected to the tracks for mounting the tracks longitudinally in an automobile trunk, a carriage movable on the tracks, an elongated load supporting platform adapted to be supported at one end in superimposed relation on the carriage and extending rearwardly therefrom, hinged extension means comprising a plurality of hinged-together segments interconnecting the rear end of the carriage and a centrally located structural component of the platform permitting downward tilting of the platform outside the trunk when the carriage is withdrawn rearwardly.

6. An extendable automobile trunk-loading apparatus comprising longitudinal track means, a load supporting carriage movable on the track means, support means connected to the forward end of the track means, laterally extendable means on the support means, an upright standard, a longitudinally disposed member supporting the standard and being slidably connected to the laterally extendable member for adjusting the standard longitudinally of the track means, and vertically adjustable means on the standard adapted to engage the ceiling of the trunk for frictionally clamping the standard between the floor and the ceiling of an automobile trunk in the laterally adjusted position of the standard.

7. An extendable automobile trunk loading apparatus comprising longitudinal track means, a load supporting carriage movable on the track means, support means connected to the forward end of the track means, a pivot connection between the track means and the forward support means for positioning the track means in varied angular positions longitudinally in a trunk, laterally extendable means, and vertically adjustable means on the standard adapted to engage the ceiling of the trunk for frictionally clamping the standard between the floor and the ceiling of an automobile trunk in the laterally adjustable position of the standard.

References Cited in the file of this patent

UNITED STATES PATENTS

| | | |
|---|---|---|
| 2,091,071 | Girl | Aug. 24, 1932 |
| 2,094,401 | Girl | Sept. 28, 1937 |
| 2,284,419 | Greig | May 26, 1942 |
| 2,547,083 | Lundgren | Apr. 3, 1951 |
| 2,774,462 | Poundstone | Dec. 18, 1956 |
| 2,778,517 | Weinstein | Jan. 22, 1957 |